United States Patent [19]

Jones

[11] Patent Number: 4,666,407

[45] Date of Patent: May 19, 1987

[54] RADAR SIGNATURE SIMULATOR

[76] Inventor: James R. Jones, 3452 Mercer La., San Diego, Calif. 92122

[21] Appl. No.: 600,538

[22] Filed: Apr. 16, 1984

[51] Int. Cl.$^4$ .................................................. G01B 9/00
[52] U.S. Cl. .......................................... 434/2; 342/169
[58] Field of Search ........................ 434/2, 5; 343/17.7

[56] References Cited

U.S. PATENT DOCUMENTS

| | | | |
|---|---|---|---|
| 4,168,502 | 9/1979 | Susie | 343/17.7 |
| 4,192,082 | 3/1980 | Deaton et al. | 434/2 |
| 4,327,417 | 4/1982 | Zaczek | 343/17.7 X |
| 4,423,418 | 12/1983 | Pearlman | 343/17.7 |
| 4,454,513 | 6/1984 | Russell | 343/17.7 X |

*Primary Examiner*—T. H. Tubbesing
*Assistant Examiner*—Mark Hellner
*Attorney, Agent, or Firm*—Thomas J. Tighe

[57] ABSTRACT

System and method for producing a pattern of radar radiation encountered by a object in the scan path of a radar, commonly referred to as "radar signature". The basic system has a memory containing at least digital amplitude information for each pulse of the signature, digital pulse width information for each pulse, digital pulse-to-pulse interval information for each pulse, scan time information and scan gap information. A digital to analog converter converts the digital amplitude information to a proportional voltage. Timers convert the pulse width information, the pulse-to-pulse interval information, scan time information and scan gap information to intervals of time in sequential fashion. During pulse width times, the output of the digital to analog converter is enabled. The output is disabled during pulse-to-pulse intervals and scan gap time. A controller controls the transfer of amplitude information from memory to the digital to analog converter and controls operation of the timers. The output of the digital to analog converter is a train of pulses of varying amplitudes. The output of the digital to analog converter can be sent directly to an intercept receiver or it can be mixed with an RF carrier wave to create a more accurate simulation of the radar signature. A computer responsive to an operator enables an operator to select a radar scenario, and based on the selected scenario, transfers amplitude and time information to the memory for use by the controller.

14 Claims, 7 Drawing Figures

RADAR SIGNATURE SIMULATOR

BACKGROUND OF THE INVENTION

This invention relates to means and methods of simulating a radar signal. As used herein the terms "radar signal" and "signal" are defined as being a pattern of electromagnetic disturbances similar or identical to a pattern of electromagnetic disturbances encountered by an object in the scan path of a radar.

In general, the purpose of a radar is to detect the presence of an object or plurality of objects when those objects are in the scan path of the radar and within the range of the radar. The advantages of using a radar in a hostile environment to detect the presence of hostile elements is well known. From the stand point of the hostile elements, it is very disadvantageous to be detected by a radar.

Sensitive intercept receivers have been developed to detect the presence of a radar signal from outside the maximum useful range of the radar. Thus, with the aid of an intercept receiver, an element can detect the presence of a radar signal before the element is detected by that radar. Being forwarned, the element can then employ electronic counter measures to avoid detection by the radar and/or to confuse the radar operator. The characteristics of radar signals vary considerably and so do their associated counter measures. In order to employ the proper counter measures, one must be trained to match the counter measures to the type of radar signal being encountered.

Heretofore, the training of a person in the recognition of the various types of radar signals has been accomplished by either placing the person and his intercept receiver in the actual radar environments or by simulating the various radar signals by prerecording the radar signals on a magnetic tape and playing back the tape into the intercept receiver itself. In other words, the tape of the prerecorded radar signals simulates the presence of the radar.

The disadvantages of the first method of training are obvious. Tape systems also have many disadvantages. Tape recorders are limited in bandwidth and a tape system is limited by the fact that only real time recording and playback are possible. This means that signals can be played back only for the time that they were originally recorded. It also means that replication (copy of a master recording) is also done in real time. Thus, a replication of a one hour master requires an additional one hour. Furthermore, the access time to a particular signal on a tape is very slow.

There are in existence simulation systems which do not use the tape method but heretofore they have all required sophisticated full size computers for operation. They tend to be highly specialized in function and very costly.

Thus there has been a long felt need for a small, compact, inexpensive radar system simulator which has the flexibility of the larger computer driven systems. This invention satisfies that need. It is small, light weight and inexpensive because it is a blend of software and hardware wherein the hardware is minimized. It is capable of producing virtually any possible radar signal or pulse group either on-demand for an indefinite period of time, or automatically for a time sequence. It is capable of generating very complex signals and complex scenario sets. It is capable of simulating one radar signal or a plurarlity of radar signals being encountered simultaneously.

Other advantages and attributes of this invention will be readily discernible upon a reading of the test hereafter.

SUMMARY OF THE INVENTION

This invention presents a system and a method of producing simulated radar signatures. As used herein, the terms "radar signature" and "signature" refer to a pattern of radar radiation encountered by an object in the scan path of a radar, and the term "burst" refers particularly to the pattern in a main radiation lobe and significant side radiation lobes. A burst nominally comprises a train of pulses who amplitude variations follow a (sine X)/X function. The basic system comprises a memory means containing at least digital amplitude information for each pulse, digital pulse width information for each pulse, digital pulse-to-pulse interval information for each pulse, scan time information, and scan gap information. As used herein, the term "pulse-to-pulse interval" refers to the time span between the leading edge of a pulse and a leading edge of a following pulse. As used herein, the term "scan time" refers to the time period that the object in the scan path of a radar actually encounters radiation from the main lobe and significant side lobes. As used herein, the term "scan gap" refers to the time gap between successive scan times. The basic system also comprises a means for converting the digital amplitude information to electronic analog information producing a pulsed analog output. There are also time measuring means for converting the pulse width information, the pulse-to-pulse interval information, the scan time information, and the scan gap information into periods of time. The memory means, the digital to analog conversion means, and all of the time measuring means are controlled by a controller means adaptable to retrieve in suitable order all of said information from the memory means and operable to apply the pulse width information, the pulse-to-pulse interval information, the scan time information and the scan gap information to their respective time measuring means, and further operable to apply the amplitude information to the digital to analog conversion means during periods of time when a pulse width coincides with a scan time and to withhold the amplitude information from the digital to analog conversion means during a pulse-to-pulse interval time period and he scan gap time period. The time measuring means can comprise hardward circuits, such as hardware counters and monostable multivibrators. In the case of a programmable controller, the time measuring means can also be one or more counting loops expending a determinable number of controller machine cycles, or a number of sequentially executed instructions expending a determinable number of machine cycles. Circuits capable of measuring time below a single machine cycle are used to bring the accuracy of the time periods to less than plus or minus 1 machine cycle. A computer with suitable peripherals can be used to derive and precompute all the required information, and be used to write said information into the memory means for use by the controller. The computer means is responsive to an operator who selects a scenario and inputs the corresponding parameters to the computer. A radio frequency carrier wave source and a radio frequency modulator can be used to modulate the carrier wave with the pulsed analog output, thus creating a more accurate simulation of the radar signature.

An object of this invention is to provide a relatively simple electronic circuit which can simulate a radar signature.

A further object of this invention is to provide a radar signature simulator which can simulate a wide variety of radar types.

A further object of this invention is to provide a radar signature simulator which can simulate an environment wherein there are multiple radar systems of varying kind.

It is a further object of this invention to present an electronic circuit which takes advantage of all of the nonpulse time periods inherent in radar signatures to creat accurate radar signatures while minimizing the number of circuits involved.

It is a further object of this invention to provide a radar signature simulator which utilizes to advantage the symmetry inherent in radar signatures to minimize memory requirements.

Other objects of this invention will be readily apparent upon a reading of the text hereinafter.

DESCRIPTION OF THE PREFERRED EMBODIMENT

The term "radar" stands for radio detection and ranging. A radar system is a system which uses transmitted radio waves and reflected radio waves for detecting a reflecting object in the scan path of the radar system. The transmitted radio wave is usually in the form of a pulse of radio frequency carrier wave. The spacing between the pulses and to some extend the pulse width determines the range of the radar system. In order for a reflected pulse to provide useful information, it must return to the radar antenna during the pulse-to-pulse interval. Of course, the more pulses radiated per second the shorter the interval between pulses. A typical long range radar radiates 300 pulses per second with a pulse width of approximately 7 microseconds. Typical short range radar sends 4,000 pulses per second with a pulse width of approximately 0.5 microseconds.

For a radar system to obtain azimuth, height and other such information, the beam of radiation must be relatively narrow and must be moved either by moving the antenna or other beam moving means. It is the movement of the relatively narrow beam across an object which produces typically the (sine X)/X function with respect to the amplitude of the pulses encountered by the object. The function represents significant side lobes and the main lobe passing across the object. The pulses of largest magnitude being part of the main lobe. Studies have shown that the number of pulses encountered by an object in the scan path of a typical search radar is less than 200 for the main lobe.

Since there are many different types of radars, a device must have flexibility with respect to pulse amplitude, pulse width, pulse-to-pulse intervals, scan times, and scan gaps, all of which can vary considerably depending on the type of radar. In some radar systems they change from event to event.

Figure 1:
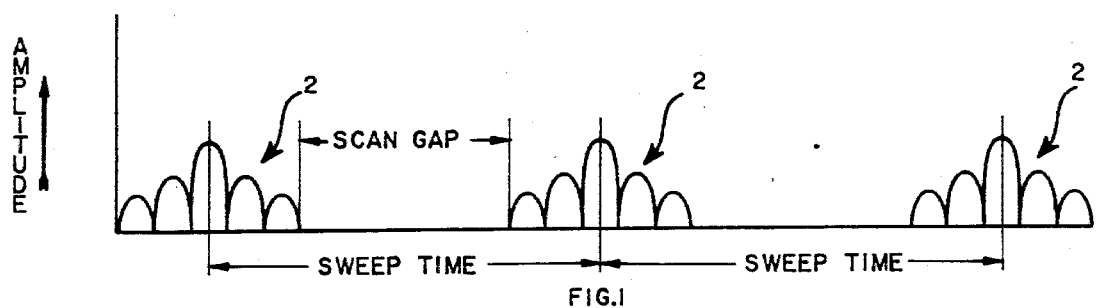
FIG. 1 is a time domain plot of multiple radar signatures.
Figure 2:
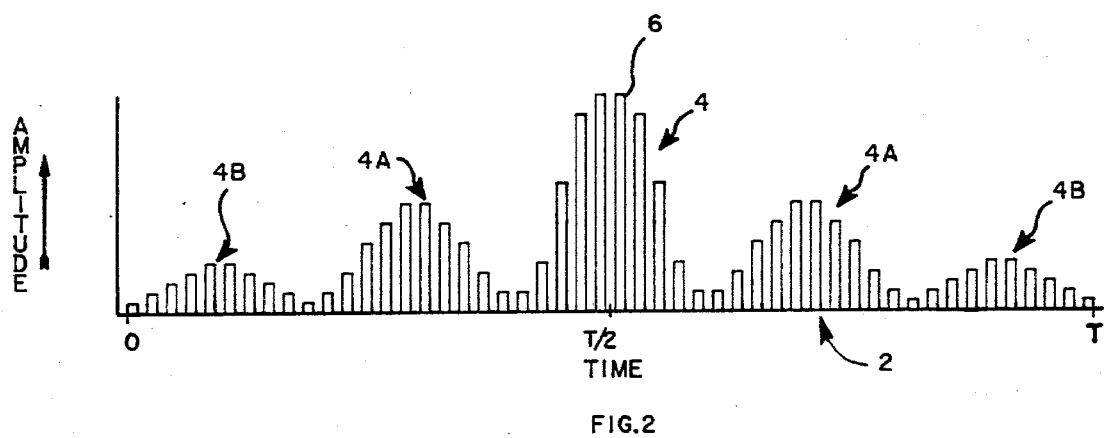
FIG. 2 is an expanded time domain plot of a single radar signature.
Figure 3:
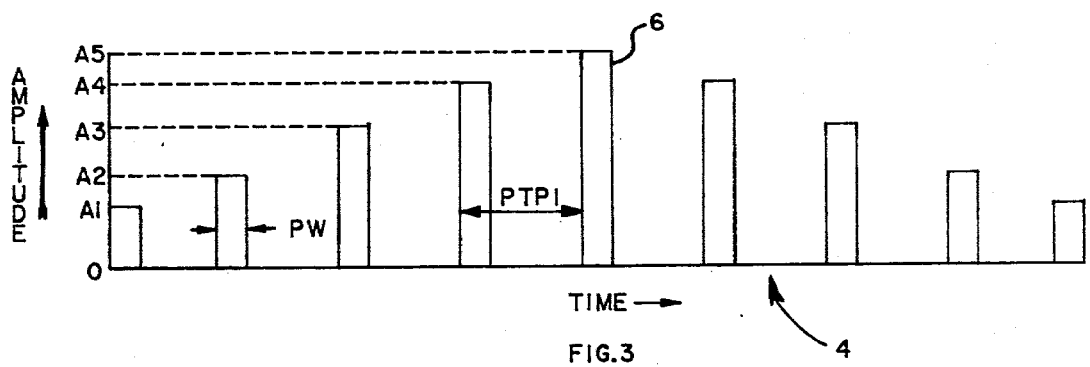
FIG. 3 is a further expanded time domain plot of the main lobe radiation of a radar signature.
Figure 4:
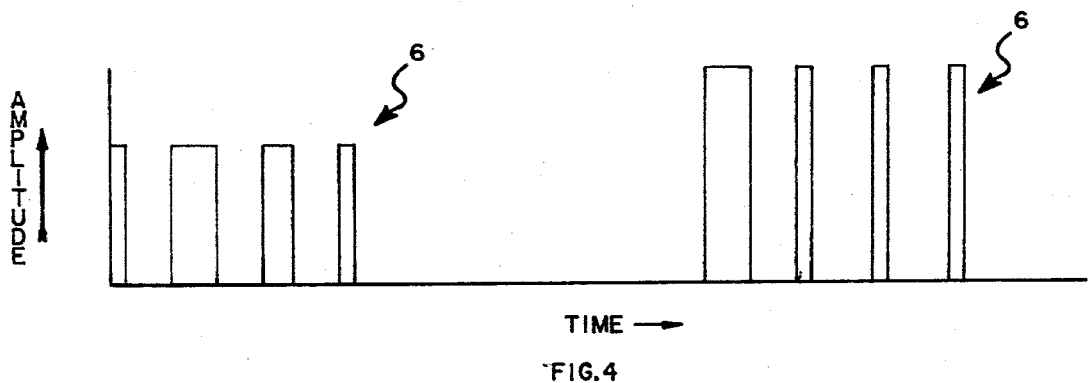
FIG. 4 is a time domain plot of same radar pulses of a multipulse radar system.
Figure 5:
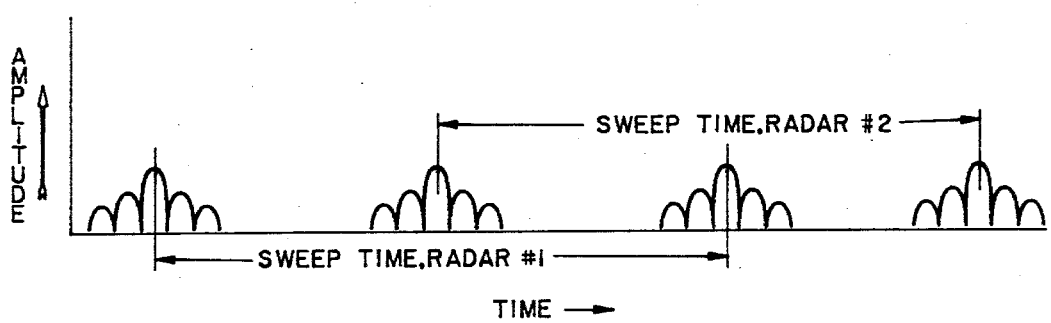
FIG. 5 is a time domain plot showing interlaced radar signatures from two (2) radar systems.

Referring to FIGS. 1 and 2, a plurality of radar bursts 2 from a single radar set are shown spaced apart. The spacing is called the "sweep time": which refers to the total time required by the radar system to make a complete path over the desired search field. Each burst 2 is shown to have a main lobe 4 and nominally two pairs of the side lobes 4A and 4B. Referring to FIGS. 2 and 3, it can be seen that as the burst 2 is expanded, it can be seen to comprise a plurality of pulses 6. Each pulse varies in amplitude. Each pulse 6 has a pulse width (PW) and a pulse-to-pulse interval (PTPI). FIG. 4 represents a special case where each pulse 6 is actually comprised of a plurality of pulses, sometimes of varying widths and pulse-to-pulse intervals. FIG. 5 represents a situation where an object is in the scan path of two (2) radar sets), and thus their signatures are interleaved.

Referring to FIG. 2, this invention makes use of the fact that a radar burst is substantially symmetrical about the midpoint, i.e. T/2 of the scan time, and the fact that each lobe of the burst is symmetrical about its midpoint.

Figure 6:
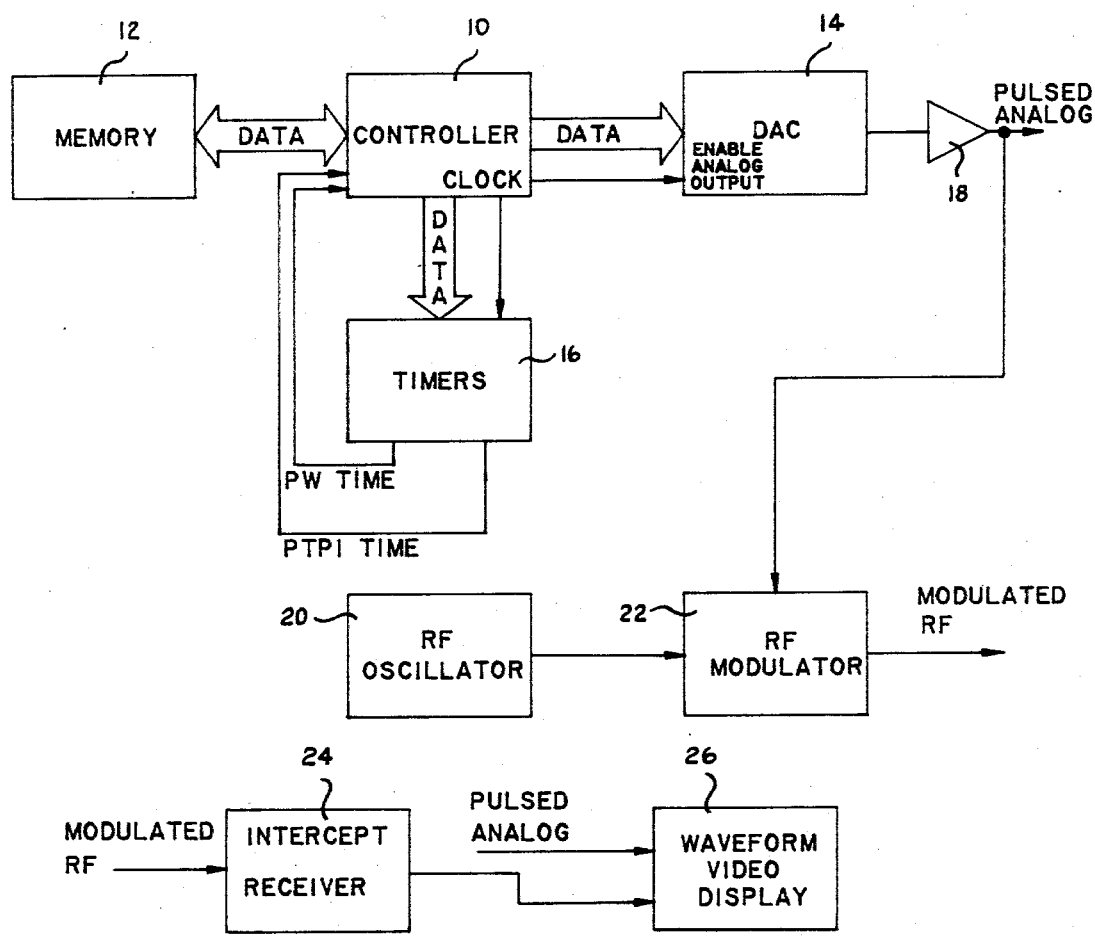
FIG. 6 is a functional block diagram of the basis system of this invention.

Referring to FIG. 6, a controller 10 controls a memory means 12, a digital to analog conversion means 14 and timers 16 via data and control lines. In order to simulate a radar signature, the memory means must contain, at least, digital amplitude information for half of the pulses in the symmetrical radar burst, digital pulse width information for each pulse, digital pulse-to-pulse interval information for each pulse, scan time information (which may be simply the number of pulses during the scan time), and scan gap information. The radar signature, exclusive of the radio frequency carrier wave, can be detected at the output of an amplifier 18 which amplifies the output of the digital to analog conversion means 14. The output of the amplifier 18 is in the form of analog pulses which simulate the radar signature pulses 6. The amplitude of each pulse in the burst is achieved by sequentially applying the digital amplitude information for each pulse from the memory means to the digital to analog conversion means (DAC) 14. This is done by the controller 10. For symmetrical main lobes, a first half is produced by using the amplitude information in one order, and a second half is produced using the amplitude information in a reverse order.

In signatures which follow a (sine X)/X pattern, an assumption can be made that side lobes have beam widths equal to a fraction of the main lobe. That fraction can be reduced, for practical purposes, to an integer ratio of some number of main lobe pulses per side lobe pulse. With this information, the controller can derive amplitude information for half of a side lobe by stepping through and using the main lobe amplitude information while skipping the ratio number of main lobe amplitudes for each amplitude retrieved, and reducing each retrieved amplitude by a suitable scaling factor. As with the main lobe, a second symmetrical half of a side lobe can be reproduced using the same amplitude information of the first half but in reverse order.

A plurality of time measuring means, the timers 16, convert the digital pulse width information, the digital pulse-to-pulse interval information, the digital scan time information, and the scan gap information into corresponding periods of time. The controller 10 provides the timers 16 with the time information stored in the memory means 12. The controller 10 applies amplitude information to the DAC only when a pulse width time coincides with a scan time, and it withholds the amplitude information from the DAC during a pulse-to-pulse interval time period and a scan gap time period. By the term "withholding the information" is meant that the controller either withholds the information from the DAC or by other means disables the output of the DAC so that the output falls to a reference level.

FIG. 6 also shows a radio frequency (RF) oscillator 20 in electrical communication with an RF modulator 22. Optionally, the output of the amplifier 18 can be sent to the RF modulator 22 to modulate the output of the RF oscillator 20, thereby creating a pulse modulated carrier wave which more accurately simulates a radar signal. The modulated RF can be fed to an intercept receiver 24 being operated by a trainee. The output of the intercept receiver being a video wave-form can be fed to a wave-form video display 26. Alternately, the pulsed analog from the amplifier 18 can be fed directly to the wave-form video display 26. In either case, a trainee will observe a simulated radar signature.

Preferably the controller has a basic machine cycle such that each function performed by the controller is performed over a fixed time period which is an integer multiple of the machine cycle. If the controller is adapted to performing counting functions and "no operation" (NOP) functions which do not alter the state of the system, the measuring of time can be accomplished within the controller by a combination of counting functions and NOP functions. A "counting function" as used herein refers to a closed loop where the controller repeatedly cycles through a fixed set of states during which the controller is counting. When the count reaches a certain point, the controller then breaks out of the closed loop. The number of machine cycles in each such counting function is determinable and therefore the time expended is determinable. A counting function can be considered a coarse time measuring means. To measure time to an accuracy of plus or minus 1 machine cycle, a suitable number N of NOP functions are appended to a counting function. If the counting function is itself accurate, then no functions are appended to it in which case N=0; if it is not so accurate, then one or more NOP functions are performed by the controller upon cessation of the counting function.

The timers 15 can also comprise at least one delay circuit responsive to control signals from the controller and operative to measure a time period less than a machine cycle in duration. Such a circuit is utilized by the controller when more accuracy in time measurement is desired. The controller triggers the delay circuit and in a time period less than a machine cycle the circuit will cause a withholding of information from the DAC.

Figure 7:
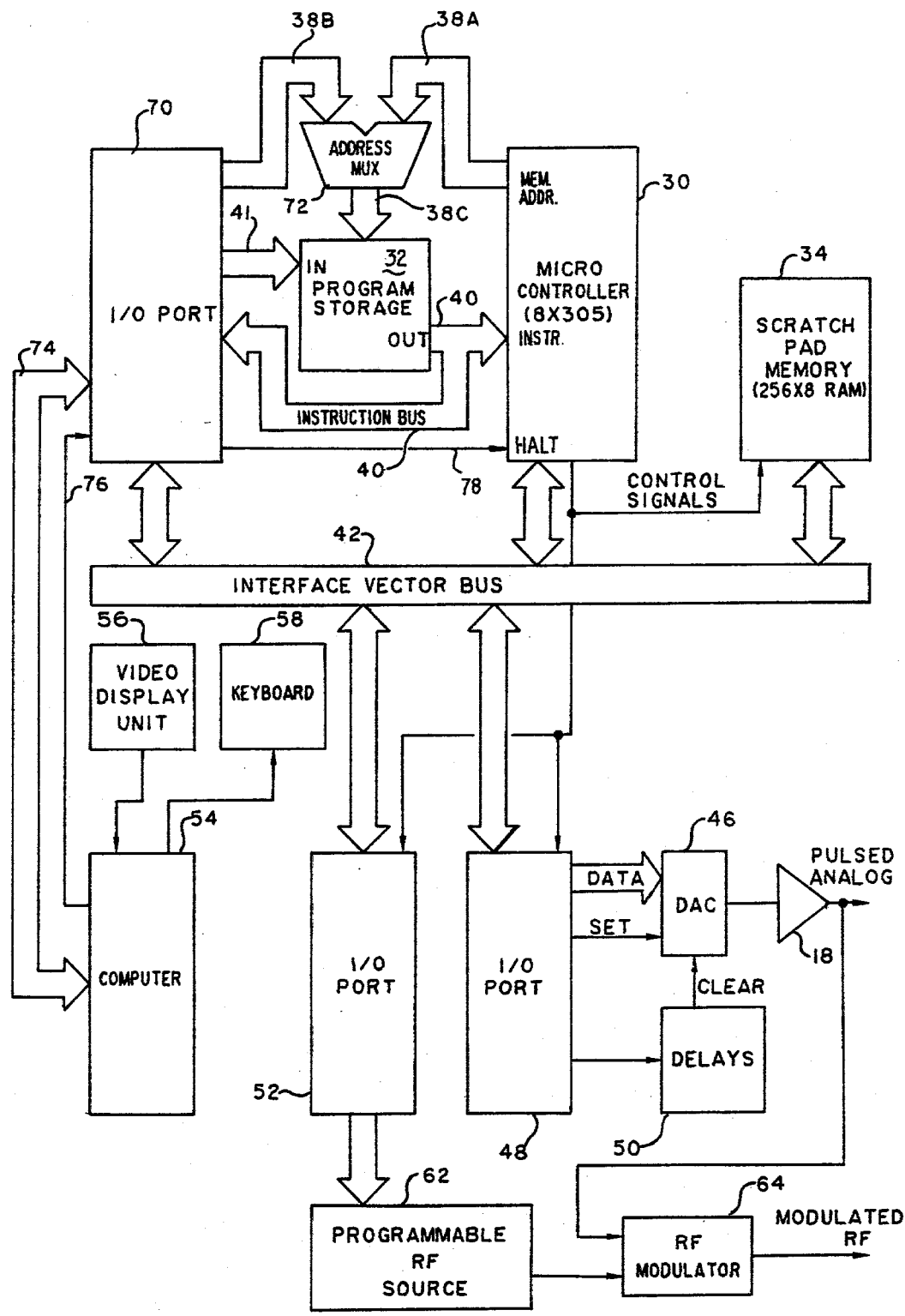
FIG. 7 is a more detailed functional block diagram of the preferred embodiment of this invention.

Referring to FIG. 7, the memory means 12 of the basic system is shown to be comprised of a program storage 32 and a scratch pad memory 34. Both memories are controlled and accessed by a microcontroller 30, a Signetics 8×305. The microcontroller 30 has a machine cycle time of 200 nanoseconds and will complete any instruction in its instruction set in one machine cycle.

The program storage 32 is a random access memory containing instructions and instruction data and it is accessible to the microcontroller 30 via an instruction address bus 38A and instruction data bus 40.

The program storage 32 is also accessible to a computer 54 via an integrated input/outport circuit (I/O port) 70. The I/O port 70 can address the program storage via address bus 38B and can write data in the storage via a data bus 41. The I/O port 70 can also read data from the storage 32 via the instruction bus 40. The storage addresses from the microcontroller 30 and the I/O port 70 are time multiplexed by an address multiplexer 72 and sent to the storage via address bus 38C.

The I/O port 70 can also access an interface vector bus 42 which is an address and data bus by which input/output devices can communicate with the microcontroller. The I/O port 70 communicates data to and from the computer 54 via data 74 and control 76 lines.

The scratch pad memory 34 is also a random access memory accessible to the controller via the interface vector bus 42.

The microcontroller sends data and control signals to a DAC 46 via an I/O port 48. The input of the DAC is essentially a set/clear register. A "set" signal from the I/O port 48 loads the digital amplifier information into the DAC 46. The amplitude information in the DAC 46 is cleared, or the output of the DAC is disabled, by a "clear" signal from an I/O port or by a delay circuit 50 which is triggered by the I/O port 48. The output of the DAC 46 goes through amplifier 18 which can be used by an RF modulator 64 to modulate the output of a programmable RF source 62 resulting in pulse modulated RF carrier wave.

The computer 54 interfaces with an operator by means of a video display unit 56 and a keyboard 58. In order to adequately train personnel in detecting and using counter measures in a radar environment, many simulated environments, scenarios, must be presented to the personnel. The flexibility of this system enables many different scenarios to be selected by an operator. The operator selects a scenario by inputting appropriate parameters to the computer via the keyboard. The computer in turn prompts and displays any parameters via the video display unit.

An additional peripheral to the computer is a mass storage means such as a magnetic storage medium, eg. a floppy disk drive. The floppy disk drive can contain signature information and/or the means to compute said information. The signature information, either pre-computed or calculated by the computer 54, is then written by the computer 54 into the program storage 32 and the scratch pad memory 34 for use by the microcontroller. While the computer is writing the signature information, the microcontroller operation is halted by I/O port 70 via a halt line 78.

Referring again to FIG. 7, it can be seen that the microcontroller interfaces to I/O port (52) via interface vector bus. This I/O port 30 communicates with a programmable RF source 62. The programmable RF source 62 can be an HP-86290 RF sweep oscillator. By using a programmable RF source, the microcontroller can vary the frequency of the RF carrier from pulse-to-pulse if desired. The output of the RF source is modulated by the pulsed analog from amplifier 18 by means of RF modulator 64. The modulated RF can be fed to an intercept receiver as discussed before and alternatively the pulsed analog can be fed directly to a wave form video display.

As can be seen, the basic tool in creating the pulse train present in each radar signature is the DAC. For each pulse, the DAC is given amplitude information, is turned on at the appropriate time, and turned off at an appropriate time. After the DAC has been turned on creating the leading edge of a pulse, a controller is involved in measuring the pulse width time, and at the expiration of the period, the controller turns off the DAC. From that point on the controller is free to do any other activities required until the time for the next pulse arrives. For a typical long range radar, which transmitts 300 pulses per second, the pulse-to-pulse interval is 3½ milliseconds. For a controller whose cycle time is 200 nanoseconds, that is a considerable amount of time to prepare for the next pulse. The controller can therefore perform many other functions which are not constrained by real time requirements during the interval. Additionally, the scan gap for a given radar is typically on the order of seconds in time duration. It is this time between scan times of a single simulated radar which permit this system to interpose additional scan times to simulate additional radars. The number of radar signatures which can be interleaved is only limited by the minimum amount of scan gap required to transfer successive signature information to the controller. The system as shown in FIG. 7 can interleave approximately five radar signatures.

The I/O ports are preferably integrated circuits adaptable for buffering data and for interfacing with the 8×305 interface vector bus. Preferably they are Signetics 8×372's or the like which are plurality of bi-directional latches.

In operation, an operator selects a radar scenario via keyboard inputs to the computer and in response to prompts from the computer displayed on the video unit. Based on the selected scenario, the computer fetches appropriate data and programs from the disc storage and precomputes appropriate data. The computer then "halts" the microcontroller and writes instructions and data into the program storage. The microcontroller is then released from the halt condition and begins to execute instructions from the program storage to produce a signature related to the selected scenario.

After going through an initialization process whereby the microcontroller moves all timing information from program memory to scratch pad memory, the controller enters a functional loop wherein the pulses are produced. The basic functional loop comprises the following steps:

1. The controller, having previously retrieved from memory an amplitude value for the next pulse, applies said value to the DAC and begins a pulse.

2. The pulse width timer, having previously been given information regarding the duration of the current pulse, measures time and indicates when a time equal to said duration has elapsed.

3. The controller then withholds the amplitude value from the DAC.

4. The signature duration timer, having previously been given information regarding the duration of the signature, measures time and indicates when time equal to said duration has elapsed.

5. If a time equal to the signature duration has elapsed, then the controller exits this loop.

6. Bearing and frequency information for the next pulse is retrieved from memory by the controller and made available to the operator.

7. An index means, having previously been set by the controller to point to a starting location in a memory table of amplitude values, is updated by the controller and made to point to the next amplitude value in the table.

8. Using the index means, the controller retrieves from memory and saves the next amplitude value.

9. An amplitude value counter, having been previously been set by the controller with the total number of values in the amplitude table, is decremented.

10. The controller then tests the amplitude counter to see if the count is exhausted.

11. If the count is exhausted, then the controller goes through an algorithm to set the index means to a new amplitude table starting location, resets the amplitude value counter to a new a number of amplitude values, and returns to step one.

12. If the count is not exhausted, then a PTPI timer, having previously been given information by the controller regarding a difference between time consumed during steps 4 through 10 and the duration of the current PTPI, measures times and indicates when a time equal to the difference has elapsed.

13. The controller then returns to step 1.

Regarding the algorithm of step 11, if all of the amplitude values of a selected signature burst are contained in the controller memory then the size of the table will equal the amplitude count and no algorithm will be necessary. If the burst is repetitive, such as when simulating a conical radar system, the algorithm will comprise simply resetting the index means to the original table starting location. If the burst is symmetrical and only half of the amplitude values are stored in memory to take advantage of the symmetry, then the method of updating the index means is simply reversed so that the index means will step through the amplitude table in a reverse direction.

In some radar systems, the pulse width is variable, even in some cases from pulse to pulse. In such a case, the basic functional loop would be modified such that, prior to step 2, the controller would either retrieve a number from memory representing the duration of the next pulse, or the controller would go through an algorithm to determine same.

In some radar systems that PTPI is variable. In such a case, the basic functional loop would be modified such that sometime prior to step 12, the controller would retrieve a number from memory representing the difference of time consumed during steps 4 through 10 and the duration of the current PTPI, or it would go through an algorithm to determine same.

As mentioned before, bearing and frequency information is made available to the operator for each pulse. Alternately, bearing and frequency information can be transmitted to the controller from an external device for comparison purposes. In such a case, the basic functional loop would be modified such that in step 6, rather than making the bearing and frequency information available to the operator, the controller would read bearing and frequency information coming from the operator and compare them with the values in memory. The controller would then exit or continue on in the loop depending on the results of the comparison.

Appended hereto are appendices A and B. Appendix A is a source listing containing all of the data and instructions necessary for an 8X305 microcontroller to simulate a conical radar system with a pulse repetition frequency of 1,000 per second and a pulse width of 1 microsecond. The listing language is that used in an 8X305 Microcontroller Cross Assembly Program (MCCAP) from Signetics Corporation of Sunnyvale, Calif.

The I/O of the 8X305 is handled in a right bank and left bank arrangement. The terms "LB" and "RB" specify the left and right banks, respectively, during "move" operations. The terms "LB8" and "RB8" specify left and right banks, respectively, during "xmit" operations. The terms "R12" through "R17" specify registers internal to the 8X305. The terms "TMR1" through "TMR3" are addresses for 3 scratch pad locations used by the signature duration timer. The duration timer is a double nested counting loop. The term "DEC" and "INC" are decrement and increment constants, respectively. The terms "DON" and "DOFF" are DAC enabling and disabling constants, respectively. The terms "BV1" and "BV2" are 2 byte values representing the bearing from the operator of the simulated radar. The terms "FV1" and "FV2" are 2 byte values representing the frequency of the simulated radar. The term "DEV" equals the number of amplitude values in the amplitude table beginning at "DATA0". The terms "TMV1" through "TMV3" or 3 initial values of the double nested counting loop of the duration timer. The terms "PRTV1" and "PRTV2" are initial values of a single nested counting function of the PTPI timer of step 12 of the basic functional loop. The term "AUX" represents the auxiliary register internal to the 8X305. NOP'S are accomplished by moving the contents of AUX to AUX.

Steps 1 through 4 of the basic functional loop are accomplished beginning with the instruction labeled "PULSE" and ending 2 instructions before "PRIT3". Step 5 is accomplished in the instruction just prior to "PRIT3". The instructions following "PRIT3" and "PRIT2" are NOP'S to equalize time consumed prior to arriving at "PRIT1". Step 6 is accomplished in the 9 instructions beginning with "PRIT1". Step 7 is accomplished in the 10th and 11th instructions following "PRIT1". Step 8 is accomplished by the 12th instruction following "PRIT1". That instruction is an indexed "execute" instruction. Internal register R3 being the index register, points to one of the instructions in the table beginning at "DATA0". The execute instruction tells the microcontroller to go to the location specified by R3 and execute only one instruction. The instructions in the table simply move a value, an amplitude value, to a register R4 internal to the microcontroller.

Steps 9 and 10 of the basic functional loop are accomplished by the 6 instructions prior to "PRI1." Step 11 is accomplished by the 3 instructions beginning with "INITIAL". Steps 12 and 13 are accomplished by the instructions from "PRI1" through the instruction following "NNOPS."

Appendix B is a source listing in the same assembler language of a circular radar with the pulse repetition frequency of 1200 and a pulse width of 1.2 microseconds. This simulates a radar with 3 pairs of side lobes and a main lobe. This type of radar follows the (sine X)/X function. The terms used in this program are identical to the terms used in appendix A with the addition of some terms. The terms "DTMR1" through "DTMR3" specific addresses for 3 scratch pad locations used by a scan gap timer. The scan gap timer is a double nested counting loop with "DTMV1" through "DTMV3" as initial values.

An analysis of the listing of appendix B by one of ordinary skill in the pertinent art would reveal a correlation between the previously described basic functional loop and the specific instructions. However, one difference between the appendices should be noted. Immediately after step 6 is performed by the 10 instructions following "PRI1," internal register 12 is tested for a non-zero condition. If register 12 is not zero, the controller branches to "UP," and increments the index register R3. If register 12 is zero, the controller decrements the index register 3. Thus, register 12 is a reminder to the controller of the direction of access through the amplitude value table. Thus, in a symmetrical burst such as this, it can be seen that only half the values need be stored in a table because half of the burst can be synthesized by stepping through the table in one direction and the other half of the burst can be synthesized by stepping through the table in the reverse direction.

The scan gap timer present in appendix B is not necessary in appendix A because the simulated radar pattern is a continuous train of pulses due to the conical pattern of the radar beam scan pattern. Thus, there is no scan gap.

The foregoing was given for illustrative purposes only and no unnecessary limitations in the following claims should be derived therefrom.

APPENDIX A

```
PROGRAM NAME IS:TOM            SCAN TYPE:CONICAL
CODED FOR HP-86290             PRF= 1000
FREQUENCY ASSSIGNED:  12000    CONICAL RATE:   32
F1=            147             RANGE= 3
F2=            136             CONICAL RATE= 32
BEARING ASSIGNED:     122      PRI= .001
Z1=             18             PRICALC= .0009998
Z2=             32                998.8   999.8   998.6
DURATION:
        MINUTES:     1.3
        SECONDS:     30

PULSE WIDTH:    1              A>TYPE TOM.SRC
PULSE REPETITION FREQUENCY: 1000        PROG TOM
```

```
LB       EQU  27H
RB       EQU  37H
DFSTHO   EQU  4H
DFSTHF   EQU  6H
DSECHO   EQU  11H
DSECHF   EQU  10H
LB8      EQU  12H
RB8      EQU  13H
R12      EQU  12H
R13      EQU  13H
R14      EQU  14H
R15      EQU  15H
R16      EQU  16H
R17      EQU  17H
TMR1     EQU  10H
TMR2     EQU  11H
TMR3     EQU  12H
DEC      EQU  377H
INC      EQU  1H
DON      EQU  3H
DOFF     EQU  0H
VAL0     EQU  0
VAL1     EQU  1
BV1      EQU  18
BV2      EQU  32
FV1      EQU  147
FV2      EQU  136
DEV      EQU  124
TMV1     EQU  255
TMV2     EQU  2
TMV3     EQU  212
PRTV1    EQU  23
PRTV2    EQU  107
         ORG  0
         XMIT TMR1,IVR
         XMIT TMV1,RB8
         XMIT TMR2,IVR
         XMIT TMV2,RB8
         XMIT TMR3,IVR
         XMIT TMV3,RB8
INITIAL  XMIT VAL0,R3
         XMIT DEV,R5
         JMP  PRI2
PULSE    XMIT DON,LB8
         MOVE AUX,AUX
         MOVE AUX,AUX
         MOVE AUX,AUX
         XMIT DOFF,LB8
         XMIT DEC,AUX
         XMIT TMR1,IVR
         MOVE RB,R13
         ADD  R13,R13
         MOVE R13,RB
         NZT  R13,PRIT3
         XMIT TMR2,IVR
         MOVE RB,R13
         ADD  R13,R13
         MOVE R13,RB
         XMIT TMR1,IVR
         XMIT TMV1,RB8
         NZT  R13,PRIT2
         XMIT TMR3,IVR
         MOVE RB,R13
         ADD  R13,R13
         MOVE R13,RB
         XMIT TMR2,IVR
         XMIT TMV2,RB8
         NZT  R13,PRIT1
         JMP  NEXT
PRIT3    MOVE AUX,AUX
         MOVE AUX,AUX
         MOVE AUX,AUX
         MOVE AUX,AUX
         MOVE AUX,AUX
         MOVE AUX,AUX
         MOVE AUX,AUX
PRIT2    MOVE AUX,AUX
         MOVE AUX,AUX
         MOVE AUX,AUX
         MOVE AUX,AUX
         MOVE AUX,AUX
         MOVE AUX,AUX
PRIT1    XMIT 2,IVL
         XMIT 3,IVL
         XMIT BV1,LB8
         XMIT 4,LB8
         XMIT BV2,LB8
         XMIT 5,IVL
         XMIT FV1,LB8
         XMIT 6,IVL
         XMIT FV2,LB8
         XMIT VAL1,AUX
         ADD  R3,R3
         XEC  DATA0(R3)
         XMIT 1,IVL
         MOVE R4,LB
         XMIT DEC,AUX
         ADD  R5,R5
         NZT  R5,PRI1
         JMP  INITIAL
PRI1     MOVE AUX,AUX
         MOVE AUX,AUX
         MOVE AUX,AUX
         MOVE AUX,AUX
PRI2     XMIT DEC,AUX
         XMIT PRTV1,R6
DLY4     XMIT PRTV2,R15
         ADD  R6,R6
DLY3     ADD  R15,R15
         NZT  R15,DLY3
         NZT  R6,DLY4
         MOVE AUX,AUX
```

```
           MOVE  AUX,AUX                XMIT  128,R4
NNOPS      XMIT  2,IVL                  XMIT  130,R4
           JMP   PULSE                  XMIT  134,R4
DATAO      XMIT  191,R4
           XMIT  204,R4                 XMIT  141,R4
           XMIT  216,R4                 XMIT  150,R4
           XMIT  227,R4                 XMIT  161,R4
           XMIT  237,R4                 XMIT  172,R4
           XMIT  245,R4                 XMIT  185,R4
           XMIT  251,R4                 XMIT  198,R4
           XMIT  254,R4                 XMIT  210,R4
           XMIT  255,R4                 XMIT  222,R4
           XMIT  253,R4                 XMIT  233,R4
           XMIT  249,R4                 XMIT  241,R4
           XMIT  242,R4                 XMIT  248,R4
           XMIT  234,R4                 XMIT  253,R4
           XMIT  223,R4                 XMIT  255,R4
           XMIT  212,R4                 XMIT  254,R4
           XMIT  199,R4                 XMIT  251,R4
           XMIT  186,R4                 XMIT  246,R4
           XMIT  174,R4                 XMIT  238,R4
           XMIT  162,R4                 XMIT  229,R4
           XMIT  151,R4                 XMIT  218,R4
           XMIT  142,R4                 XMIT  206,R4
           XMIT  135,R4                 XMIT  193,R4
           XMIT  130,R4                 XMIT  180,R4
           XMIT  128,R4                 XMIT  168,R4
           XMIT  128,R4                 XMIT  156,R4
           XMIT  131,R4                 XMIT  146,R4
           XMIT  136,R4                 XMIT  138,R4
           XMIT  143,R4                 XMIT  132,R4
           XMIT  152,R4                 XMIT  129,R4
           XMIT  163,R4                 XMIT  128,R4
           XMIT  175,R4                 XMIT  129,R4
           XMIT  188,R4                 XMIT  133,R4
           XMIT  201,R4                 XMIT  139,R4
           XMIT  213,R4                 XMIT  148,R4
           XMIT  225,R4                 XMIT  158,R4
           XMIT  235,R4                 XMIT  169,R4
           XMIT  243,R4                 XMIT  182,R4
           XMIT  250,R4                 XMIT  194,R4
           XMIT  254,R4                 XMIT  207,R4
           XMIT  255,R4                 XMIT  219,R4
           XMIT  254,R4                 XMIT  230,R4
           XMIT  250,R4                 XMIT  239,R4
           XMIT  244,R4                 XMIT  247,R4
           XMIT  236,R4                 XMIT  252,R4
           XMIT  226,R4                 XMIT  255,R4
           XMIT  215,R4                 XMIT  255,R4
           XMIT  202,R4                 XMIT  252,R4
           XMIT  190,R4                 XMIT  247,R4
           XMIT  177,R4                 XMIT  240,R4
           XMIT  165,R4                 XMIT  231,R4
           XMIT  154,R4                 XMIT  221,R4
           XMIT  144,R4                 XMIT  209,R4
           XMIT  137,R4                 XMIT  196,R4
           XMIT  131,R4                 XMIT  183,R4
           XMIT  128,R4                 XMIT  171,R4
                                        XMIT  159,R4
```

```
        XMIT   149,R4
        XMIT   140,R4
        XMIT   134,R4
        XMIT   129,R4
        XMIT   128,R4
        XMIT   128,R4
        XMIT   132,R4
        XMIT   137,R4
        XMIT   145,R4
        XMIT   155,R4
        XMIT   166,R4
        XMIT   179,R4
        END TOM
```

APPENDIX B

```
A>PROGRAM NAME IS:TOMCIR
CODED FOR HP-86290
FREQUENCY ASSSIGNED:   2345
F1=         8
F2=        44
BEARING ASSIGNED:   324
Z1=        50
Z2=        64
DURATION:
    MINUTES:    1
    SECONDS:   30

PULSE WIDTH:   1.2
PULSE REPETITION FREQUENCY:1200
SCAN TYPE:CIRCULAR
    SIDELOBE LEVEL   1 = 12
    SIDELOBE LEVEL   2 = 18
    SIDELOBE LEVEL   3 = 25
BW 5.7 SCANT 3.2 PRF 1200 DT 0
PRI= 8.33333E-04
PRICALC= .0008332
    823    833.2   823

A>
A>TOYPE ITOMCIR.SRC
        PROG TOMCIR
LB      EQU   27H
RB      EQU   37H
DFSTH0  EQU   4H
DFSTHF  EQU   6H
DSECH0  EQU   11H
DSECHF  EQU   10H
LB8     EQU   12H
RB8     EQU   13H
R12     EQU   12H
R13     EQU   13H
R14     EQU   14H
R15     EQU   15H
R16     EQU   16H
```

```
R17     EQU   17H
TMR1    EQU   10H
TMR2    EQU   11H
TMR3    EQU   12H
DTMR1   EQU   40H
DTMR2   EQU   41H
DTMR3   EQU   42H
DTMRA   EQU   45H
DTMRB   EQU   46H
DTMRC   EQU   47H
DEC     EQU   377H
INC     EQU   1H
DON     EQU   3H
DOFF    EQU   0H
VAL0    EQU   0
VAL1    EQU   1
BV1     EQU   50
BV2     EQU   64
FV1     EQU   8
FV2     EQU   44
DEV     EQU   121
DTMV1   EQU   6
DTMV2   EQU   9
DTMV3   EQU   67
DTMVA   EQU   0
DTMVB   EQU   0
DTMVC   EQU   0
TMV1    EQU   255
TMV2    EQU   2
TMV3    EQU   212
PRTV1   EQU   9
PRTV2   EQU   227
        ORG   0
RESET   XMIT  DTMR1,IVR
        XMIT  DTMV2,RB8
        XMIT  DTMR2,IVR
        XMIT  DTMV2,RB8
        XMIT  DTMR3,IVR
        XMIT  DTMV3,RB8
        JMP   INITIAL
        XMIT  TMR1,IVR
        XMIT  TMV1,RB8
        XMIT  TMR2,IVR
        XMIT  TMV2,RB8
        XMIT  TMR3,IVR
        XMIT  TMV3,RB8
        JMP   INITIAL
PREP    XMIT  0,AUX
        MOVE  AUX,R12
        XMIT  DEV,R5
        JMP   REVRS
INITIAL XMIT  VAL0,R3
        XMIT  1,AUX
        MOVE  AUX,R12
        XMIT  DEV,R5
PULSE   XMIT  DON,LB8
        XMIT  DEC,AUX
        XMIT  1,R14
```

```
DLY1    ADD   R14,R14                       MOVE  R4,LB
        NZT   R14,DLY1                      XMIT  DEC,AUX
        MOVE  AUX,AUX                       ADD   R5,R5
        XMIT  DOFF,LB8           REVRS      NZT   R5,PRI
        XMIT  DEC,AUX                       XMIT  DEC,AUX
        XMIT  TMR1,IVR                      XMIT  DTMR1,IVR
        MOVE  RB,R13                        MOVE  RB,R13
        ADD   R13,R13                       ADD   R13,R13
        MOVE  R13,RB                        MOVE  R13,RB
        NZT   R13,PRI3                      NZT   R13,DRIT3
        XMIT  TMR2,IVR                      XMIT  DTMR2,IVR
        MOVE  RB,R13                        MOVE  RB,R13
        ADD   R13,R13                       ADD   R13,R13
        MOVE  R13,RB                        MOVE  R13,RB
        XMIT  TMR1,IVR                      XMIT  DTMR1,IVR
        XMIT  TMV1,RB8                      XMIT  DTMV1,RB8
        NZT   R13,PRI2                      NZT   R13,DRIT2
        XMIT  TMR3,IVR                      XMIT  DTMR3,IVR
        MOVE  RB,R13                        MOVE  RB,R13
        ADD   R13,R13                       ADD   R13,R13
        MOVE  R13,RB                        MOVE  R13,RB
        XMIT  TMR2,IVR                      XMIT  DTMR2,IVR
        XMIT  TMV2,RB8                      XMIT  DTMV2,RB8
        NZT   R13,PRI1                      NZT   R13,DRIT1
        JMP   NEXT                          JMP   RESET
PRI3    MOVE  AUX,AUX            DRIT3      MOVE  AUX,AUX
        MOVE  AUX,AUX                       MOVE  AUX,AUX
        MOVE  AUX,AUX                       MOVE  AUX,AUX
        MOVE  AUX,AUX                       MOVE  AUX,AUX
        MOVE  AUX,AUX                       MOVE  AUX,AUX
        MOVE  AUX,AUX                       MOVE  AUX,AUX
        MOVE  AUX,AUX                       MOVE  AUX,AUX
PRI2    MOVE  AUX,AUX            DRIT2      MOVE  AUX,AUX
        MOVE  AUX,AUX                       MOVE  AUX,AUX
        MOVE  AUX,AUX                       MOVE  AUX,AUX
        MOVE  AUX,AUX                       MOVE  AUX,AUX
        MOVE  AUX,AUX                       MOVE  AUX,AUX
        MOVE  AUX,AUX                       MOVE  AUX,AUX
        MOVE  AUX,AUX                       MOVE  AUX,AUX
PRI1    XMIT  2,IVL              DRIT1      XMIT  1,IVL
        XMIT  0,LB8                         XMIT  0,LB8
        XMIT  3,IVL                         XMIT  1,R5
        XMIT  BV1,LB8                       XMIT  0,R3
        XMIT  4,LB8
        XMIT  BV2,LB8
        XMIT  5,IVL              PRI        XMIT  DEC,AUX
        XMIT  FV1,LB8                       XMIT  PRTV1,R6
        XMIT  6,IVL              DLY4       XMIT  PRTV2,R15
        XMIT  FV2,LB8                       ADD   R6,R6
        NZT   R12,UP              DLY3      ADD   R15,R15
        XMIT  DEC,AUX                       NZT   R15,DLY3
        JMP   SUM                           NZT   R6,DLY4
UP      XMIT  1,AUX                         XMIT  AUX,AUX
        MOVE  AUX,AUX             NNOPS     XMIT  2,IVL
SUM     ADD   R3,R3                         JMP   PULSE
        JMP   DATAS                         ORG   256,256
CONT    XMIT  1,IVL              DATAS      XEC   DATA0(R3)
```

```
           JMP CONT                     XMIT   57,R4
DATA0      XMIT    1,R4                 XMIT   45,R4
           XMIT    6,R4                 XMIT   32,R4
           XMIT   14,R4                 XMIT   20,R4
           XMIT   22,R4                 XMIT    9,R4
           XMIT   30,R4                 XMIT    0,R4
           XMIT   39,R4                 XMIT   12,R4
           XMIT   48,R4                 XMIT   26,R4
           XMIT   56,R4                 XMIT   41,R4
           XMIT   64,R4                 XMIT   57,R4
           XMIT   72,R4                 XMIT   73,R4
           XMIT   79,R4                 XMIT   90,R4
           XMIT   84,R4                 XMIT  105,R4
           XMIT   89,R4                 XMIT  121,R4
           XMIT   92,R4                 XMIT  135,R4
           XMIT   94,R4                 XMIT  147,R4
           XMIT   95,R4                 XMIT  158,R4
           XMIT   94,R4                 XMIT  166,R4
           XMIT   92,R4                 XMIT  173,R4
           XMIT   89,R4                 XMIT  177,R4
           XMIT   84,R4                 XMIT  178,R4
           XMIT   79,R4                 XMIT  177,R4
           XMIT   72,R4                 XMIT  173,R4
           XMIT   64,R4                 XMIT  166,R4
           XMIT   56,R4                 XMIT  158,R4
           XMIT   48,R4                 XMIT  147,R4
           XMIT   39,R4                 XMIT  135,R4
           XMIT   30,R4                 XMIT  121,R4
           XMIT   22,R4                 XMIT  105,R4
           XMIT   14,R4                 XMIT   90,R4
           XMIT    6,R4                 XMIT   73,R4
           XMIT    0,R4                 XMIT   57,R4
           XMIT    9,R4                 XMIT   41,R4
           XMIT   20,R4                 XMIT   26,R4
           XMIT   32,R4                 XMIT   12,R4
           XMIT   45,R4                 XMIT    0,R4
           XMIT   57,R4                 XMIT    8,R4
           XMIT   70,R4                 XMIT   18,R4
           XMIT   83,R4                 XMIT   27,R4
           XMIT   95,R4                 XMIT   38,R4
           XMIT  106,R4                 XMIT   48,R4
           XMIT  115,R4                 XMIT   59,R4
           XMIT  124,R4                 XMIT   70,R4
           XMIT  131,R4                 XMIT   82,R4
           XMIT  136,R4                 XMIT   93,R4
           XMIT  139,R4                 XMIT  105,R4
           XMIT  140,R4                 XMIT  117,R4
           XMIT  139,R4                 XMIT  128,R4
           XMIT  136,R4                 XMIT  140,R4
           XMIT  131,R4                 XMIT  151,R4
           XMIT  124,R4                 XMIT  162,R4
           XMIT  115,R4                 XMIT  172,R4
           XMIT  106,R4                 XMIT  183,R4
           XMIT   95,R4                 XMIT  192,R4
           XMIT   83,R4                 XMIT  202,R4
           XMIT   70,R4                 XMIT  210,R4
```

```
XMIT    218,R4
XMIT    226,R4
XMIT    232,R4
XMIT    238,R4
XMIT    243,R4
XMIT    247,R4
XMIT    250,R4
XMIT    253,R4
XMIT    254,R4
JMP PREP
END TOMCIR
```

I claim:

1. A system for producing simulated radar signatures comprising:
   (a) a memory means containing at least digital amplitude information for each radar pulse, pulse width information for each pulse, pulse-to-pulse interval informatin for each pulse, scan time information, and scan gap information,
   (b) a means for converting the digital amplitude information to electronic analog information,
   (c) a time measuring means for converting the pulse width information into a time indicating signal,
   (d) a time measuring means for converting the pulse-to-pulse interval information into a time indicating signal,
   (e) a time measuring means for converting the scan time information into a time indicating signal,
   (f) a time measuring means for converting the scan gap information into a time indicating signal,
   (g) a controller operable to retrieve in suitable order all of said information from the memory means and to apply said information to their respective time measuring means, and further operable to apply amplitude information to the digital to analog conversion means whenever a pulse width time measuring signal coincides with a scan time measuring signal and to withhold amplitude information from the digital to analog conversion means during pulse-to-pulse interval time measuring signals and during scan gap time measuring signals, the controller having a basic machine cycle time, and
   (h) a delay circuit responsive to signals from the controller and operative to generate a time measuring signal less than a machine cycle in duration and further operative to remove amplitude information from the analog to digital conversion means at the end of said signal.

2. The system of claim 1 wherein the controller is programmable to execute one or more no operations consecutively and wherein the pulse width time measuring means comprises the controller executing a suitable number of programmed no operation functions.

3. The system of claim 1 wherein the controller is programmable to execute one or more no operations consecutively and execute a counting function of variable duration and wherein the pulse width time measuring means comprises the controller executing a combination of a programmed counting function and a suitable number of programmed no operation functions.

4. The system of claim 1 wherein the controller is programmable to execute one or more no operations consecutively and execute a counting function of variable duration and wherein the pulse-to-pulse interval time measuring means comprises the controller executing a combination of a programmed counting function and a suitable number of programmed no operation functions.

5. The system of claim 1 wherein the controller is programmable to execute one or more no operations consecutively and execute a counting function of variable duration and wherein the scan time measuring means comprises the controller executing a combination of a programmed counting function and a suitable number of programmed no operation functions.

6. The system of claim 1 wherein the controller is programmable to execute one or more no operations consecutively and execute a counting function of variable duration and wherein the scan gap time measuring means comprises the controller executing a combination of a programmed counting function and a suitable number of programmed no operation functions.

7. The system of claim 1 wherein the memory means comprises a random access memory containing instructions and instruction data and accessible to the controller via an instruction address bus and an instruction data bus, and a scratch pad random access memory accessible to the controller via an input/ouput bus, and wherein the controller is an integrated circuit microcontroller, and wherein the microcontroller directly controls the digital to analog conversion means by means of data and control signals sent to the digital to analog conversion means via an integrated data register in electrical communication with the input/ouput bus.

8. The system of claim 1 wherein the memory means comprises a random access memory containing instructions and instruction data and accessible to the controller via an instruction address bus and an instruction data bus, and a scratch pad random access memory accessible to the controller via an input/output bus, and wherein the controller is an integrated circuit microcontroller, and wherein the microcontroller directly controls the digital to analog conversion means by means of data and control signals sent to the digital to analog conversion means via a first integrated data register in electrical communication with the input/output bus, and wherein the delay circuit is a monostable multivibrator controlled by the microcontroller via a second data register in electrical communication with the input/output bus, the multivibrator being triggered to its unstable state by a bit of said second register and the output of the multivibrator being gated to the digital to analog conversion means by another bit of said second register.

9. In a system comprising a controller, a digital to analog conversion means, a pulse width timer, a signature duration timer, an index means, a counting means, a pulse-to-pulse interval timer, and a memory means containing a set of pulse amplitude values having a starting and an ending location, the number of amplitude values, pulse duration information for the set of pulses, signature duration information and pulse-to-pulse interval information for each pair of pulses, a method of simulating a radar signature comprising the steps:
   (a) using an index means initially set to point to a starting location in the set of amplitude values, the controller retrieves from memory an amplitude value for the next pulse, applies said value to the digital to analog conversion means and begins a pulse,
   (b) the pulse width timer having information regarding the duration of the current pulse measures and indicates when a time equal to said duration has elapsed, (c) the controller then withholds the amplitude value from the digital to analog conversion means, (d) the signature duration timer, having information regarding the duration of the current signature, measures time and indicates when a time equal to said duration has elapsed, (e) if a time equal to the signature duration has elapsed, the controller then exits this method, (f) bearing and frequency information for the next pulse is retrieved from memory by the controller and made available to the operator, (g) the index means is updated by the controller and made to point to the next amplitude value in the set, (h) using the index means, the controller retieves from memory and saves the next amplitude value, (i) the counter, initially set by the controller with the number of values in the amplitude table is decremented, (j) the controller then tests the amplitude counter to see if the count is exhausted, (k) if the count is exhausted, then the controller goes through an algorithm to set the index to a new amplitude value set starting location, resets the counter to a new number of ampliude values, and returns to step (a), (l) if the content is not exhausted, then the pulse-to-pulse interval timer, having information regarding a difference between timed consumed during steps (d) through (j) and the duration of the current pulse-to-pulse interval, measures time and indicates when a time equal to the difference has elapsed, and (m) the controller returns to step (a).

10. The method of claim 9 wherein the algorithm of step (k) comprises the steps:
(a) the counting means is reset to the number of amplitude values in the set, and
(b) the index means is reset to the starting location of the amplitude value set.

11. The method of claim 9 wherein the algorithm of step (k) comprises the steps:
(a) the counting means is reset to the number of amplitude values in the set,
(b) the index means remains unchanged, and
(c) a flag means is altered so as to direct the controller to reverse the way the index means is updated in step (g).

12. The method of claim 9 wherein step (b) comprises the steps:
(a) the controller retrieves pulse duration information for the current pulse from memory,
(b) the controller gives said information to the pulse width timer, and
(c) the pulse width timer measures time and indicates when a time equal to the current pulse duration has elapsed.

13. The method of claim 1 wherein step (1) comprises the steps:
(a) the controller retrieves information reqarding the difference between the time consumed during steps (d) through (j) and the duration of the current pulse-to-pulse interval, from memory,
(b) the controller gives said information to the pulse-to-pulse interval timer, and
(c) the pulse-to-pulse interval timer measures time and indicates when a time equal to the difference has elapsed.

14. The method of claim 1 wherein step (f) comprises the steps:
(a) bearing and/or frequency information is retrieved by the controller from memory,
(b) bearing and/or frequency information is retrieved by the controller from an operator,
(c) a comparison is made by the controller of the bearing and/or frequency information from memory with the bearing and/or frequency information from the operator,
(d) if there is no difference, then the controller continues on to step (g), and
(e) if there is a difference, the controller takes alternative action.

* * * * *